Inventor
Alan A. Matthies

United States Patent Office 3,478,534
Patented Nov. 18, 1969

3,478,534
THERMISTOR CONTROLLED REFRIGERATION EXPANSION VALVE
Alan A. Matthies, Milwaukee, Wis., assignor to Controls Company of America, Melrose Park, Ill., a corporation of Delaware
Filed Aug. 11, 1967, Ser. No. 659,962
Int. Cl. F25b *41/04;* G05d *23/24*
U.S. Cl. 62—225                                27 Claims

ABSTRACT OF THE DISCLOSURE

An expansion valve includes an electrical heat motor operator which responds to an electrical input to control the valve opening and, correspondingly, flow of refrigerant in a refrigeration system. A thermistor is connected in the electrical circuit providing the input to the heat motor. The thermistor is directly exposed to refrigerant flowing in the refrigeration system and is thermally insulated from the structural elements of the system so that the thermistor operates on the basis of self-heating and responds to the condition of the refrigerant, i.e. its state or phase and temperature. The thermistor has a markedly significant response to the difference between refrigerant in a liquid phase and a gaseous phase and is capable of providing control about 0° superheat. In one aspect a single thermistor is used to control the heat motor operator. In another aspect two thermistors are utilized to control the heat motor, one positioned on the inlet side of the evaporator coil and the other on the outlet side of the evaporator coil.

BACKGROUND OF INVENTION

Field of invention

This invention relates to control of refrigeration systems and, more particularly, to the control of expansion valves in a refrigeration system.

Description of prior art

Refrigeration system controls are known which sense the temperature or condition of the refrigerant and/or the evaporation coil, for example, and translate the sensed condition into mechanical motion of an expansion valve in the system. For example, charged bulbs have been used to sense temperature conditions and on the basis of variations in the sensed condition produce a pressure change on a diaphragm operator to achieve movement of a valve. Also, arrangements are known wherein the valve is controlled by an electrically energized heat motor which is also exposed to the condition of system flow. Valve control is achieved on the basis of heat transfer between the heat motor and its ambient, which ambient is in turn influenced directly or indirectly by the condition of system flow.

SUMMARY OF INVENTION

The flow of refrigerant in a refrigeration system can be controlled by a heat motor operated expansion valve. The heat motor operates the valve in response to an electrical signal. In accordance with this invention, an electrical circuit element, the characteristics of which can be made to vary with variations in temperature, is included in the control circuit of the heat motor and is exposed to the condition of the refrigerant flowing in the system. Preferably a thermistor is exposd to refrigerant flow so that its temperature is dependent upon the condition of the refrigerant in the area of the thermistor, and is connected in the heat motor control circuit to control the heat motor. In accordance with more specific aspects of this invention, the thermistor is positioned within the system with direct thermal conductive exposure to the flowing refrigerant and is also preferably thermally isolated from the structural elements of the refrigeration system to increase the influence on the thermistor of self-generated heat.

In accordance with a further aspect of this invention, two thermistors are used in the control circuit, one located at the inlet to the evaporator, the other at the evaporator outlet. A switch is also connected in the control circuit and is effective to remove one of the thermistors from the circuit leaving the operator under the sole control of the remaining thermistor and converting to operation of a type whereby a desired condition of the evaporator coil can be maintained. Preferably, an electrical circuit element is connected in circuit with the thermistor, or thermistors, and cooperates in establishing the thermal sensitivity of the thermistor, or in the case of two thermistors the relative thermal sensitivity of the thermistors with respect to each other.

DESCRIPTION OF PREFERRED EMBODIMENT

Figure 1:
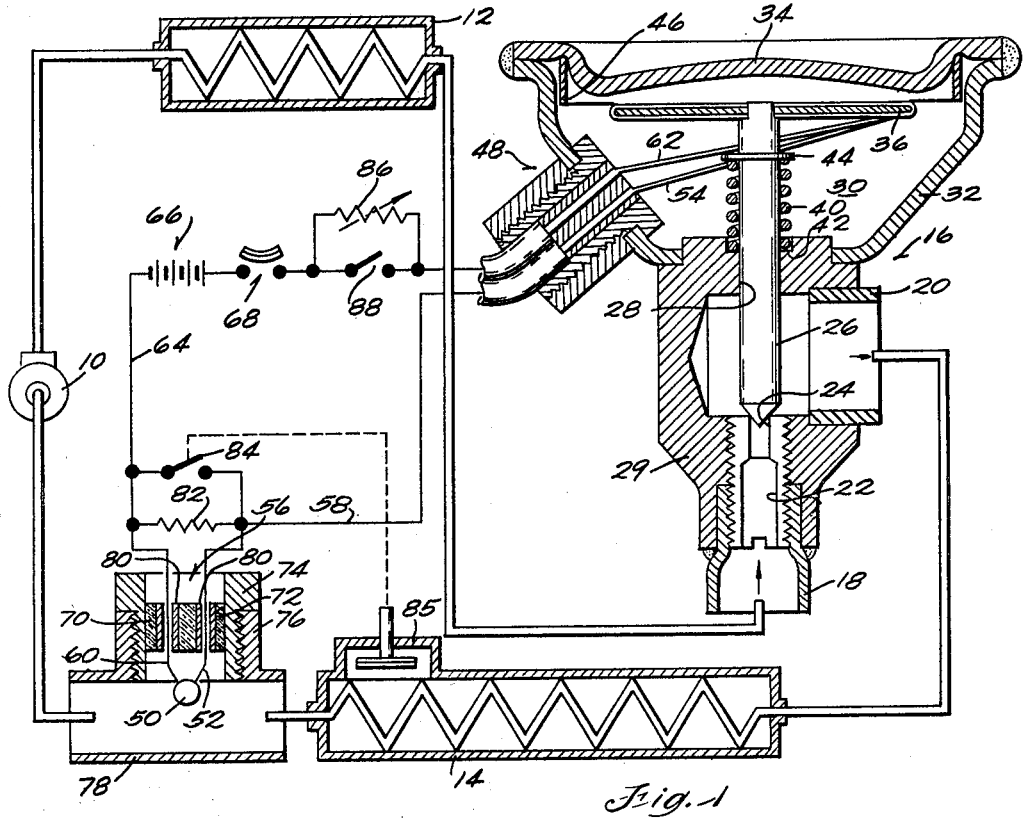
FIG. 1 is a semi-diagrammatical illustration of a refrigeration system incorporating the expansion valve control of this invention and having various portions of the control and the refrigeration system enlarged for illustrative purposes.

With particular reference to the drawings, a refrigeration system is illustrated which includes a conventional arrangement of compressor 10, condenser 12, evaporator 14 and valve 16. Valve 16 is connected in the system between condenser 12 and evaporator 14 and is capable of regulating the amount of refrigerant permitted to expand into evaporator 14.

Valve 16 includes an inlet coupling 18, outlet coupling 20 and insert 22 defining an orifice 24 in the passage between the inlet and outlet. Flow through the valve is controlled on the basis of the relative position between needle valve 26 and orifice 24. Needle valve 26 is slidable axially in bore 28 in valve body 29 and its axial movement is controlled by a heat motor operator assembly located in chamber 30. The chamber is defined by a cup-shaped plate 32 attached to the valve body and cover-plate 34 welded to plate 32. The operator assembly includes a bimetal 38, heater coil 36 wound on the bimetal plate and biasing spring 40. The biasing spring is seated between shoulder 42 in the valve body and washer 44 attached to the needle. Heater 36 can be a wire of Nichrome, or the like, wound in heat transfer relation on the bimetal with a suitable electrical insulating medium arranged between the wire and the bimetal. Spring 40 urges the bimetal against ring 46 which is seated against cap 34. The bimetal is illustrated in its normal or "cold" position wherein it holds the needle valve closed in orifice 24 interrupting flow through the valve and, correspondingly, through the system. The ends of heater wire 36 pass from chamber 30 through terminal assembly 48 attached to plate 32 for connection in a control circuit which, in a manner to be described more completely hereinafter, is effective to vary the input to heater 36 and thereby bow the bimetal to manipulate the needle valve. Briefly, as current in heater wire 36 heats bimetal 38 the bimetal bows upwardly, as viewed in FIG. 2, lifting the needle valve from orifice 24 and opening the valve to refrigerant flow. Conversely, as current is reduced the bimetal cools and tends to return to its normal position moving the needle valve toward the orifice to restrict flow. In this respect, engagement between bimetal 36 and ring 46 facilitates bimetal cooling in that the ring makes a thermal connection to the outer housing formed by plate 32 and cap 34 to provide a heat sink for the bimetal. The just described operator assembly is one example of the type of heat motor operator which can be used in connection with the control of this invention and, as this description proceeds, it will be appreciated that other heat motor arrangements can be utilized so long as they are capable of responding to a variable electrical signal.

In accordance with this invention, the valve is controlled by varying the electrical input to the heater. The electrical input to the heater is controlled by a thermistor exposed to the refrigeration system at a sensing area or control point so that its temperature is determined by the temperature and/or phase of the refrigerant flowing at the sensing area. Thermistors possess the characteristic of having a resistance value which varies in accordance with temperature changes of the thermistor itself. One type of thermistor exhibits negative temperature coefficients of resistance in that the resistance values vary inversely with temperature and another type exhibits positive coefficients whereby their resistance value varies directly with temperature.

It has been discovered that a thermistor element can be included in the control circuit for the heat motor operator of the valve and exposed to the condition of the refrigeration system to achieve control of refrigerant flow on the basis of changes induced in the thermistor as a result of variations which occur in the refrigerant or the refrigeration system in general. The thermistor can be exposed directly to the flow of refrigerant or can be connected to structural elements of the refrigeration system such as the evaporator coil or various points along the system conduit. FIG. 1 illustrates a thermistor 50 mounted within the system at the outlet of the evaporator coil for direct exposure to refrigerant flow. Also, FIG. 1 illustrates a typical electrical circuit by means of which the thermistor controls the electrical input to heater 36.

Turning to the electrical circuit, thermistor lead 52 passes through terminal assembly 56 and is connected to heater lead 54 through conductor 58. Similarly, the other thermistor lead 60 passes through the terminal assembly and is connected to heater lead 62 through conductor 64, the thermistor and heater are connected to a suitable electrical source such as batteries 66 and the circuit also includes a switch 68. The thermistor and heater are thus arranged in series with the other and with source 66, which source could be AC as well as DC as illustrated. Switch 68 can be a manually operated switch or a thermostatic switch as illustrated and can be the main switch which also controls compressor 10 and/or whatever mechanism is utilized for directing air over the evaporator coil. In the illustrated circuit arrangement thermistor 50 has a negative temperature coefficient of resistance so that as its temperature increases, its resistance decreases thereby increasing current in heater 36 and operating valve 16 in an opening direction. When switch 68 is open the valve is in an "off" condition and remains off unless cooling is called for by closure of switch 68.

When positioned within the system the thermistor is preferably suspended from its own terminal and thermally isolated from the structural elements of the system to minimize heat sink and, correspondingly, increase the influence of self-generated heat on the thermistor temperature. Terminal assembly 56 is constructed to cooperate in achieving this thermal isolation, and includes insert 70, of electrical and thermal insulating material such as glass or ceramic, fixed in bore 72 of plug 74 threaded into coupling 76 in conduit 78. A pair of metallic tubes 80 are positioned in axial openings in insert 70 and terminals 52 and 60 of the thermistor are soldered to tubes 80. This solder connection has not been shown in preference to showing the schematic circuit diagram. Insert 70 provides electrical insulation for the thermistor and also exhibits poor heat conducting properties to minimize conduction of self-generated heat from the thermistor.

With the illustrated circuit and structural arrangement of FIG. 1 current in the heater is also common to thermistor 50 and, when the circuit is completed, the thermistor begins to experience self-generated heat. As its temperature increases, its resistance decreases increasing the amount of current in heater 36 to bow the bimetal and drive valve 16 open. The thermistor has a relatively small mass and this, coupled with the suspension on its own leads with a minimum heat sink, affords relatively rapid response to self-generated heat. For example, thermistor chips approximately .2–.3 inch in diameter and .030 inch thick have given satisfactory results.

After initial start-up, the thermistor continues to experience an increase in temperature due to self-generated heat and also responds to the phase and/or temperature and/or state of the refrigerant leaving the evaporator. Valve 16 is thus held open to maintain flow of refrigerant into the evaporator. As the start-up cycle proceeds, refrigerant in excess of that required to meet the load demand will eventually be introduced into the evaporator which results in refrigerant in a liquid phase leaving the evaporator. The thermistor has greater self-heating ability in a gaseous ambient but responds immediately to the liquid medium. Due to its relatively small mass, the cooling effect due to engagement with the liquid is extremely rapid and the thermistor experiences a sudden and abrupt drop in temperature. This results in a substantial increase in the resistance in the heater circuit thereby reducing current in the heater which tends to close the valve and reduce refrigerant flow to an amount which corresponds more closely with the demand on the evaporator. The use of the thermistor, together with its mounting which minimizes heat sink and its relatively small mass, provides an extremely sensitive control element. It has been discovered that the thermistor responds to the change in phase of the refrigerant, from a gas to liquid, and inserts a relatively high resistance in the circuit in a matter of, for example, two seconds after sensing the presence of liquid phase refrigerant. This provides an extremely sensitive sensor element and it has been further discovered that sensitivity which is achieved leads to a substantial reduction in "hunt" as compared to experience with conventional expansion type valves and sensing arrangements. The explanation of this reduction in "hunt" is believed to be that the rapid response of the thermistor to changes in temperature or phase of the refrigerant and the speed with which the sensed condition is transmitted to the operator in the form of an operator signal both coupled with the delay inherent in the electrical operator, namely the cooling or heating of the bimetal which must occur to open or close the valve, results in an effective compromise in sensing and corection time which substantially eliminates over-correction for changes and thereby eliminates "hunt." For example, in many prior art type devices the element sensing the changes in refrigerant state was relatively slow acting, that is slow acting as compared to the response of the thermistor, and this coupled with the delay in converting the sensed signal to mechanical movement of a valve generally resulted in over-correction of the valve which then produced a series of control oscillations before the control and valve settled on the necessary operative condition.

It has also been found that the inherent sensitivity of the thermistor can be further improved by insertion of suitable resistances in circuit with the thermistor. As illustrated, resistance 82 is connected in parallel with thermistor 50. The higher the value of resistance 82, the greater will be the sensitivity of the thermistor, that is the higher the resistance element is with respect to the maximum resistance of the thermistor. Thermal sensitivity can be defined as the measure of the net impedance or voltage change in the circuit for a given change in temperature. Experience has shown that a valve can be selected for this resistance which will eliminate substantially all "hunt" in the control or, in other words, produce virtually linear control characteristics through valve 16. Although the use of the parallel resistance is preferred it is possible that the sensitivity of the thermistor per se could be increased and the resistance eliminated.

In addition, switch 84 can also be connected in parallel with both the thermistor and resistance 82. This switch is capable of shunting both the thermistor and the resistance. With the switch open the thermistor is capable of maintaining a condition of 0° superheat at the outlet of the evaporator, in other words a condition wherein a minute trickle of liquid is maintained at the evaporator coil indicating that complete evaporation of refrigerant is occurring in the coil. Closure of switch 84 interrupts this 0° superheat function and the switch can be used to establish a minimum temperature for the evaporator and thereby, for example, prevent evaporator freeze-up. In this respect swtich 84 is illustrated as being controlled by temperature sensitive operator 85 exposed to the evaporator, operator 85 is shown in a general manner as bimetal and its onnection to switch 84 is illustrated in a schematic manner as it can take any conventional form. Operator 85 can be set to close switch 84 and shunt the thermistor and resistance 82 when the evaporator coil reaches a temperature of 32° F. It will also be appreciated that the switch could be a manual switch or a pressure actuated swtich as desired. When switch 84 closes, the thermistor and resistance 82 are removed from the circuit and there is a maximum electrical input to heater 36 causing the valve to go into a full open position radically increasing the refrigerant fed to the coil and virtually flooding the coil with liquid refrigerant, an immediate increase in evaporator pressure and temperature results and prevents evaporator freeze-up. As the temperature of the evaporator coil increases, switch 84 will eventually be opened to re-establish the thermistor circuit for control in the manner described. It wil be appreciated that resistance 82 and switch 84 represent circuit variations which can be included in or eliminated from the basic circuit as desired.

A further circuit variation is also illustrated in FIG. 1 and consists of switch 88 and resistance 86 connected in parallel in lead 64. Resistance 86 is illustrated as a variable resistance element and switch 88 is shown as a manual switch. Resistance 86 can be actuated manually or by a thermostat arrangement (not shown) and when switch 88 is open the resistance provides for control over the power input to the heater and, correspondingly, controls the refrigerant passed by the valve. This control establishes an over-all operating condition within which the thermistor controls. The use of the variable resistance provides a wide range of adjustment, but it is also possible to replace the variable resistance with a fixed resistance which, in combination with switch 88, can provide high or low power operation levels for the valve. More specifically, with the switch open the resistance is in circuit providing low power level operation whereas when the switch is closed the resistance is shunted and the heater would operate at a higher power level.

Figure 2:
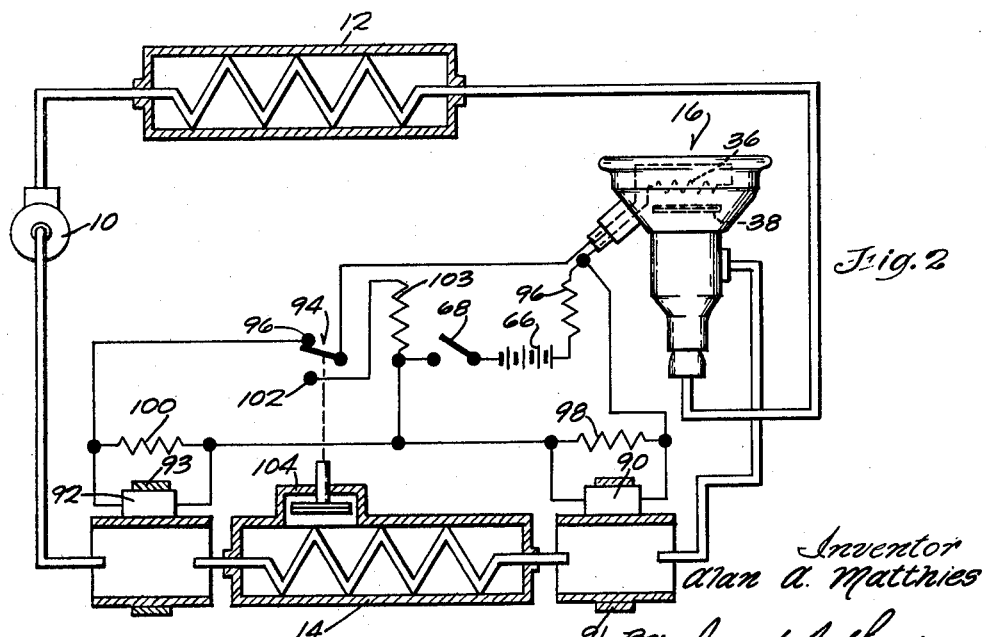
FIG. 2 is a semi-diagrammatical illustration of a refrigeration system with an alternative form of the control circuit of this invention.

The embodiment described to this point provides an effective manner of achieving control. The control responds to the temperature and phase of the refrigerant in the area of the thermistor, the control point, and specifically permits 0° superheat control at the control point which in this instance is the outlet end of the evaporator. It will be appreciated that the thermistor could be positioned to sense at other control points in the system. The arrangement in FIG. 2 illustrates an alternative control arrangement. In FIG. 2, compressor 10, condenser 12, evaporator 14 and valve 16 are arranged in the same conventional manner as FIG. 1; however, in this instance two thermistors are used in the valve control circuit. One thermistor, 90, is positioned at the inlet end of the evaporator coil and the other thermistor 92, is positioned at the outlet end to sense evaporator inlet and outlet temperature, respectively.

Heater 36 is connected to electrical source 66 which again is either DC as illustrated or an AC source. Since the valve of FIG. 2 is identical to that of FIG. 1 only the heater and bimetal have been illustrated and they in schematic form. Switch 68 controls the heater circuit and when closed energizes the heater. A two position switch 94 may also be used in the control circuit to provide two different circuit variations, as illustrated switch 94 is closed on contact 96 connecting thermistor 92 in the control circuit, the other circuit variation will be described later. In the illustrated circuit arrangement, thermistor 92 is in series with heater 36 and source 66 whereas thermistor 90 is part of a parallel shunt circuit around the heater. In the illustrated circuit arrangement both thermistors 90 and 92 have negative temperature coefficients of resistance. Also in this variation the thermistors, although they could be arranged as shown in FIG. 1, are not directly exposed to refrigerant in the interior of the refrigeration system but are connected to external members by bands 91 and 93. As an alternative the thermistors could be positioned inside of their respective conduits for direct exposure to the refrigerant. The thermistors intimately engage the system conduit and if desired conventional means of improving heat transfer with the external refrigeration circuit system can be used. In this variation, the structural refrigeration circuit elements provide a heat sink for the thermistors thereby minimizing, in this embodiment, self-heating effects and making the thermistors more sensitive to system conditions.

In operation, an increase in evaporator coil outlet temperature, indicative of an increase in load on the evaporator and a need for more refrigerant, is sensed by thermistor 92 and evidences itself in an increase in thermistor temperature. The increase in thermistor temperature decreases the thermistor resistance and produces an increase in current in heater 36 thereby opening the valve to increase refrigerant flow to meet the increased demand. With reference to the inlet end of the evaportor, an increase in evaporator inlet temperature results in an increase in the temperature of thermistor 90 decreasing its resistance and shunting current from the heater. This tends to close valve 16 and reduce refrigerant flow to the evaporator. Therefore, an increase in evaporator outlet temperature tends to open the expansion valve whereas an increase in evaporator inlet temperature tends to close the expansion valve and the thermistors tend to maintain a constant temperature differential between the evaprator inlet and outlet. For example, the circuit elements can be balanced so that the coil outlet is 10° warmer than the coil inlet and with the evaporator operating with approximately 10° superheat at the outlet end. In this arrangement any increase in load on the evaporator would result in a corresponding increase in the outlet temperature and produce the necessary opening of valve 16 to accommodate the increased load, the inlet thermistor 90 senses the change and maintains the desired temperature differential across the evaporator coil. A decrease in evaporator load, with the corresponding decrease in thermistor temperature, will achieve an opposite correction. Namely, the temperature of outlet thermistor 92 will decrease increasing its resistance to reduce the current through heater 36 and tending to close valve 16, again the inlet thermistor senses the change and maintains the desired temperature differential.

Resistance 96 is in series with source 66 and heater 36 and functions as a current limiting resistance and, moreover, functions in conjunction with thermistor 90 to reduce the input to heater 36 as the shunt circuit resistance through thermistor 90 is reduced. If a limited power source is utilized, resistance 96 could be eliminated if desired.

As in the embodiment of FIG. 1, resistances 98 and 100 are provided in parallel with thermistors 90 and 92 and again cooperate in determining the thermal sensitivity of the thermistors as was stated above, the higher the value of resistance in elements 98 and 100 the greater will be the thermal sensitivity of the respective thermistors.

In some refrigeration system applications it is desirable to increase coil superheat as the evaporator load increases, in others it is desirable to have coil superheat decrease as evaporator load increases and in still other applications it is desirable to maintain relatively constant superheat for all loads. The circuit illustrated in FIG. 2 lends itself particularly well to achieving either one of these three variations by regulating the thermal sensitivity of the thermistors. If the thermal sensitivity at the evaporator coil outlet is greater than that at the inlet then the net impedance change at the outlet will be greater than at the inlet and since the outlet thermistor is tending to open the valve whereas the inlet thermistor is tending to close the valve there will be an overall increase in the valve opening thereby increasing the flow of refrigerant and bringing about an overall decrease in evaporator coil temperature or a reduction in superheat condition within the coil. Similarly, if the thermal sensitivity at the inlet thermistor is greater than at the outlet, then the net impedance change at the inlet, or in the shunt circuit, is greater than at the outlet thermistor. Hence, although the valve will be driven open to meet the increased demand, the influence of the inlet thermistor will be greater so that the valve does not open to the degree called for by the outlet thermistor and as the evaporator load increases it is accommodated but with an overall reduction in evaporator coil temperature and superheat condition. In the former coil superheat increases as the load increases, and in the latter it decreases as the load increases but in both cases the valve opening is increased to accommodate the higher load. Lastly, if the thermal sensitivities of the two thermistors are equal the superheat condition within the coil, or the temperature of the coil itself, will remain relatively constant for changes in load. With the illustrated circuit the thermal sensitivities of the inlet and outlet thermistor can be readily regulated by varying the value of resistances 98 and 100 with respect to each other and their respective thermistors. For example, to increase the thermal sensitivity at the outlet and with respect to the thermistor at the inlet the value of element 100 will be made relatively greater than the resistance value of thermistor 92, and the difference in values between resistance 98 and thermistor 90 will be made less than the difference in values between element 100 and thermistor 92. To increase sensitivity at the inlet the relative difference in values would be reversed.

The circuit variation discussed in connection with FIG. 1, resistance 86 and switch 88, can also be utilized in the circuit of FIG. 2 and for the same purpose.

Returning to switch 94, when the switch is positioned to close on contact 102 outlet thermistor 92 is removed from the control circuit and only the inlet thermistor 92 is removed from the control circuit and only the inlet thermistor remains. With this circuit arrangement a type of control is achieved which has normally required the use of what is commonly referred to as an automatic expansion valve in the refrigeration system and it functions to maintain a constant evaporator temperature and pressure. Generally these are constant pressure type expansion valves which cannot be converted in a system to control system superheat, which is usually achieved by including a thermostatic expansion valve in the system. Thus in order to obtain both types of system control heretofore it was necessary to include two types of valves in the same system.

In operation with switch 94 closed on contact 102, thermistor 90 again regulates current flow in the shunt circuit around the heater. Therefore, as the evaporator temperature decreases indicating a decrease in evaporator load the thermistor temperature decreases resulting in less current being shunted from the heater 36. This promotes valve movement in an opening direction to increase the flow of refrigerant to the evaporator and achieves an immediate increase in evaporator temperature and pressure. Conversely, an increase in evaporator load will result in an overall increase in evaporator temperature and a corresponding increase in thermistor temperature. This results in a decrease in the resistance in the parallel circuit shunting more current from the heater and tending to close the valve thereby reducing refrigerant flow and bringing about an immediate decrease in evaporator pressure and temperature. Thus the inlet thermistor now maintains the evaporator at a relatively constant temperature and pressure. Resistance 103 is preferably included in the circuit to maintain the circuit impedance substantially the same as when thermistor 92 is in the circuit.

This control of evaporator temperature, instead of superheat, is conventionally used where it is intended to prevent evaporator freeze-up or operation below freezing temperatures. With the circuit of FIG. 2, the control can be set up to provide conventional superheat control until the evaporator temperature reaches an undesirable minimum level. At that point the control can be converted, by closure of switch 94 on contact 102, to control evaporator temperature and thereby prevent any additional drop in evaporator temperature. To achieve this, switch 94 could be actuated by operator 104 exposed to the evaporator coil as illustrated. Similar to operator 85, operator 104 can be of any conventional form and therefore is illustrated schematically. Furthermore, the circuit could be arranged to provide a maximum limit on the temperature and pressure of the evaporator coil. In this regard operator 104 would be set to close switch 94 on contact 102 in response to a predetermined maximum coil temperature, or an interior coil pressure.

This circuit provides a relatively simple electrical sensing and control mechanism for a refrigeration system. The control per se is relatively simple and also is extremely versatile lending itself to a number of alternative arrangements. In addition to those already discussed, it is possible that the thermal sensitivity of the thermistor could be further improved through suitable electrical amplification. For example, the thermistor could be arranged to control a transistor in circuit with the heater and thereby achieve amplification such that with a minimal temperature change in the system the heater could be made to drive the valve to either a full open or closed position.

The use of the thermistor provides a particularly sensitive control and one which can provide various types of control, for example, superheat control (0° superheat or any desired superheat temperature), evaporator coil temperature control, and one which will respond rapidly to changes in temperature and/or phase of the refrigerant.

Although this invention has been illustrated and described in connection with particular embodiments thereof, it will be apparent to those skilled in the art that various changes and modifications may be made therein without departing from the spirit of the invention.

I claim:
1. In combination in a refrigeration ssytem,
  valve means operable to control refrigerant flow in said system,
  operator means connected to said valve means and, in response to an electrical input, operating said valve means to determine refrigerant flow therethrough,
  a control circuit for said operator means,
  thermistor means in said control circuit and, on the basis of the temperature condition of said thermistor means, controlling the operative state of said operator means,
  and means supporting said thermistor means within said system, with direct exposure to and for direct contact by the refrigerant flowing in said system, thermally insulated from the structural elements of said system, and so that said thermistor means operates on the basis of self-heating of said thermistor means and has a markedly significant response to the difference between liquid and gaseous phase of the refrigerant contacting said exposed thermistor means and provides control about 0°.

2. The combination of claim 1 including electrical circuit means in circuit with said thermistor means and cooperating to determine the thermal sensitivity of said thermistor means.

3. The combination of claim 1 wherein said thermistor means includes terminal leads, and said means supporting said thermistor means in the refrigeration system supports said thermistor means by said terminal leads in the conduit of said system, said supporting means including thermal insulating means insulating said thermistor means and terminal leads from the structural elements of said refrigeration system so that said thermistor means responds to the temperature and phase of the refrigerant and the thermistor means is self-heating.

4. The combination of claim 1 including electrical resistance means in parallel circuit relationship with said thermistor means and cooperating to establish the thermal sensitivity of said thermistor means.

5. In combination in a refrigeration system valve means operable to control refrigerant flow in said system, heat motor means connected to said valve means and, in response to an electrical input, operating said valve means to determine refrigerant flow therethrough, a control circuit for said heat motor means, first and second thermistors in said control circuit located one on the inlet side of the evaporator coil of said system and the other on the outlet side of said evaporator coil and, on the basis of the temperature of said thermistors, controlling the operative state of said heat motor means, means supporting said thermistors in said system with direct thermal conductive exposure to the condition of said refrigeration system so that the temperature of said thermistors is dependent upon the condition of the refrigeration system in the area of said thermistor, said control circuit includes switch means in circuit with said first and second thermistors and said heat motor means and arranged to selectively connect said first thermistor in and remove said first thermistor from said control circuit, and wherein said second thermistor is exposed to and responsive to the temperature of said evaportor coil.

6. The combination of claim 5 wherein said switch means is a condition responsive switch and is operatively associated with said evaporator coil, said switch means being operative to remove said first thermistor from said control circuit in response to a predetermined condition at said evaporator coil.

7. The combination of claim 5 including electrical circuit element means in parallel circuit relationship with each of said first and second thermistors cooperating to determine the thermal sensitivity of said thermistors.

8. In combination in a refrigeration system valve means operable to control refrigerant flow in said system, a bimetal element connected to said valve means and an electrical heater element in heat transfer relation with said bimetal element to displace said bimetal element and operate said valve means to determine refrigerant flow therethrough, a control circuit for said electrical heater element, thermistor means, in said control circuit and, on the basis of the temperature condition of said thermistor means, controlling the operative state of said operator means, and said thermistor means connected in and exposed to the condition of said refrigeration system so that the temperature of said thermistor means is dependent upon the condition of the refrigeration system in the area of said thermistor means.

9. The combination of claim 8 wherein said thermistor means is disposed within said refrigerant system and directly exposed to refrigerant in said system, including means thermally isolating said thermistor means from the structural elements of said refrigeration system so that the thermistor means temperature is dependent upon the temperature and state of said refrigerant and the self-generated heat of said thermistor means, and wherein said thermistor means is in circuit with and controls the input to said heater element.

10. The combination of claim 9 wherein said thermistor means has a relatively small mass so as to experience rapid changes in temperature and to respond rapidly to changes in state of said refrigerant.

11. In combination in a refrigeration system valve means operable to control refrigerant flow in said system, a bimetal element connected to said valve means and an electrical heater element in heat transfer relation with said bimetal element to displace said bimetal element and operate said valve means to determine refrigerant flow therethrough, a control circuit for said electrical heater element, first and second thermistors attached to the refrigeration system in heat transfer relation with the interior thereof, one of said thermistors located on the inlet side of the evaporator and the other located on the outlet side of the evaporator and both in circuit with and controlling the input to said heater element, and said thermistors connected and exposed to the condition of said refrigeration system so that the temperature of said thermistors is dependent upon the condition of the refrigeration system in the area of said thermistors.

12. The combination of claim 11 including switch means in circuit with said first and second thermistors and said heater element and arranged to selectively remove said first thermistor from said control circuit.

13. In combination in a refrigeration system, valve means operable to control refrigerant flow in said system, operator means connected to said valve means and, in response to an electrical input, operating said valve means to determine refrigerant flow therethrough, a control circuit for said operator means, first and second thermistor means located one on the inlet side of the evaporator coil of said refrigeration system and the other on the outlet side of said evaporator coil, means connecting said thermistor means in and exposed to the condition of said refrigeration system so that the temperature of said thermistor means is dependent upon the condition of the refrigeration system in the area of said thermistor means, and said thermistor means characterized by having a predetermined relationship of thermal sensitivity therebetween to thereby control change in refrigerant condition as said thermistor means control said valve means to adjust refrigerant flow in accordance with changes in load on said refrigeration system.

14. In combination in a refrigeration system, first and second thermistors located one on the inlet side of the evaporator coil of said refrigeration system and the other on the outlet side of said evaporator coil, valve means operable to control refrigerant flow in said system, electrically energized heat motor means connected to said valve means and, in response to an electrical input, operating said valve means to determine refrigerant flow therethrough, a control circuit for said heat motor means and including said first and second thermistors which, on the basis of the temperature condition of said thermistors, controls the operative state of said heat motor means, said first thermistor being in series circuit relationship with said heat motor means and said second thermistor being in parallel circuit relationship with said heat motor means and said first thermistor, said thermistors connected in and exposed to the condition of said refrigeration system so that the temperatures of said thermistors are dependent upon the condition of the refrigeration system in the area of said thermistors, and switch means in circuit with one of said thermistors and operative selectively to open and complete the electrical circuit of said one thermistor and said heat motor means so that said heat motor means is controlled, respectively, by one or both of said thermistors.

15. The combination of claim 14 wherein the thermistor remaining in circuit with said heat motor means after the circuit of said one thermistor and heat motor means is open is located on the inlet side of said evaporator coil.

16. The combination of claim 14 including control means connected to said switch means and exposed to the condition of the evaporator of said refrigeration system, said control means sensing said condition of said evaporator and operating said switch means on the basis of the sensed condition to open and complete the circuit of said one thermistor and said heat motor means.

17. In combination in a refrigeration system, valve means operable to control refrigerant flow in said system, heat motor means connected to said valve means and, in response to an electrical input, operating said valve means to determine refrigerant flow therethrough, a control circuit for said heat motor means, thermistor means in said control circuit and, on the basis of the temperature condition of said thermistor means, controlling the operative state of said heat motor means, means supporting said thermistor means in said system with direct thermal conductive exposure to the refrigerant flowing in said system, thermally insulated from the structural elements of said system, and so that said thermistor means operates on the basis of self-heating of said thermistor means and has a markedly significant response to the difference between liquid and gaseous phase of the refrigerant and can provide control about 0° superheat, and switch means in circuit with said thermistor means and said heat motor means and operative selectively to complete an electric circuit to said heat motor means by-passing said thermistor means so that said heat motor means is operable selectively under and free of influence of said thermistor means.

18. In combination in a refrigeration system, valve means operable to control refrigerant flow in said system, electrically energized heat motor means connected to said valve means and, in response to an electrical input, operating said means to determine refrigerant flow therethrough, a control circuit for said heat motor means, thermistor means in said control circuit and, on the basis of the temperature condition of said thermistor means, controlling the operative state of said heat motor means, switch means in circuit with said thermistor means and said heat motor means and operative selectively to complete an electric circuit to said heat motor means by-passing said thermistor means so that said heat motor means is operable selectively under and free of influence of said thermistor means, means supporting said thermistor means in and exposed to the condition of said refrigeration system so that the temperature of said thermistor means is dependent upon the condition of the refrigeration system in the area of said thermistor means, and control means connected to said switch means and exposed to the condition of the evaporator coil of said refrigeration system, said control means sensing staid condition and operating said switch means on the basis of the sensed condition to alternately complete said by-pass circuit and connect said heat motor means for control by said thermistor means.

19. In combination in a refrigeration system valve means operable to control refrigerant flow in said system, operator means connected to said valve means, and, in response to an electrical input, operating said valve means to determine refrigerant flow therethrough, a control circuit for said operating means, electrical circuit means in said control circuit characterized by having electric circuit characteristics which vary in accordance with variations in temperature of said electrical circuit means and controlling said operator means in accordance with electric circuit characteristics, and means supporting said electrical circuit means within said system with direct exposure to and for direct contact by the refrigerant flowing in said refrigeration system, thermally insulated from the structural elements of said system so that the temperature of said electrical circuit means is dependent upon the condition of the refrigerant in the area of and contacting said exposed electric circuit means and said electrical circuit means has a markedly significant response to the difference between liquid and gaseous phase of refrigerant and the operative state of said valve means is varied in accordance with sensed condition of said refrigerant and control about 0° superheat can be provided.

20. In combination in a refrigeration system valve means operable to control refrigerant flow in said system, operator means connected to said valve means and, in response to an electrical input, operating said valve means to determine refrigerant flow therethrough, a control circuit including a single thermistor and operative to control the electrical input to said operator means, and said thermistor connected in and having direct thermal conductive exposure to the refrigerant flowing in said refrigeration system so that the temperature of said thermistor is dependent upon the condition of the refrigerant in the area of said thermistor and response of said control circuit is solely on the basis of the condition sensed by said thermistor.

21. The combination of claim 20 including means supporting said thermistor thermally insulated from the structural elements of said system and with direct thermal conductive exposure to the refrigerant flowing in said system so that said thermistor is self-heating and the temperature of said thermistor is dependent upon the heat transfer between said thermistor and the refrigerant in the area of said thermistor.

22. In combination in a refrigeration system valve means operable to control refrigerant flow in said system, a temperature responsive actuator member connected to said valve means, electrically energized heater means in heat transfer relation with said actuator member, a control circuit including a single thermistor and operative to control the electrical input to said operator means, said thermistor connected in and exposed to the condition of said refrigeration system so that the temperature of said thermistor is dependent upon the condition of the refrigerant in the area of said thermistor and response of said control circuit is solely on the basis of the condition sensed by said thermistor, and said thermistor being in circuit with said heater means and is operative to vary the electrical input to said heater means on the basis of the temperature of said thermistor.

23. The combination of claim 22 wherein said thermistor is in series with said heater.

24. The combination of valve means operable to control flow through said valve means, operator means connected to said valve means and, in response to an electrical input, operating said valve means to determine flow therethrough, a single thermistor connected to and, on the basis of the temperature condition of said thermistor, operative to control the operative state of said operator means, and mounting means for connecting said thermistor in a sensing area, said mounting means including means thermally insulating said thermistor from the structural elements of said mounting means while leaving said thermistor directly exposed to the conditions ambient the thermistor in said sensing area so that said thermistor is self-heating and the temperature of said thermistor is dependent upon said ambient condition in said sensing area with said thermistor having a markedly significant response to the presence of liquid in said sensing area.

25. In combination in a refrigeration system, valve means operable to control refrigerant flow in said system, heat motor comprising electrically energized heater means and a temperature responsive actuator member in heat transfer relation with said heater means and connected to said valve means, said heat motor means operative in response to an electrial input to said heater means to operate said valve means to determine refrigerant flow through said valve means, a control circuit for said operator means, thermistor means in said control circuit and, on the basis of the temperature condition of said thermistor means, controlling the operative state of said operator means, means supporting said thermistor means within said system with direct thermal conductive exposure to the refrigerant flowing in said system, thermally insulated from the structural elements of said system, and so that said thermistor means operates on the basis of self-heating of said thermistor means and has a markedly significant response to the different between liquid and gaseous phase of the refrigerant and can provide control about 0° superheat, and said thermistor means is in circuit with said heater means and is operative to vary the electrical input to said heater means on the basis of the temperature of said thermistor means.

26. The combination of claim 25 wherein said thermistor means is in series with said heater means.

27. In combination in a refrigeration system, valve means operable to control refrigerant flow in said system, heat motor means connected to said valve means and, in response to an electrical input, operating said valve means to determine refrigerant flow therethrough, a control circuit for said heat motor means, thermistor means in said control circuit and, on the basis of the temperature condition of said thermistor means, controlling the operative state of said heat motor means, means supporting said thermistor means within said system, with direct thermal conductive exposure to the refrigerant flowing in said system, thermally insulated from the structural elements of said system, and so that said thermistor means operates on the basis of self-heating of said thermistor means and has a markedly significant response to the difference between liquid and gaseous phase of the refrigerant and can provide control about 0° superheat, and control means comprising switch means and electric resistance means in parallel circuit relationship with each other with respect to said heat motor means for controlling the power level of operation of said heat motor means.

References Cited

UNITED STATES PATENTS

| 2,534,455 | 12/1950 | Koontz | 62—223 |
| 2,583,178 | 1/1952 | Huntington | 62—223 |
| 3,205,675 | 9/1965 | Matthies | 62—225 |
| 3,324,674 | 6/1967 | Finnegan | 62—224 |
| 3,397,552 | 8/1968 | Harnish | 62—202 |

FOREIGN PATENTS 638,726   3/1962   Canada.

MEYER PERLIN, Primary Examiner

U.S. Cl. X.R.

236—92

UNITED STATES PATENT OFFICE
CERTIFICATE OF CORRECTION

Patent No. 3,478,534                 November 18, 1969

Alan A. Matthies

It is certified that error appears in the above identified patent and that said Letters Patent are hereby corrected as shown below:

Column 9, line 8, after "0°" insert -- superheat --.
Column 10, lines 1 and 2, "operator means" should read -- bimetal element and heater element --.

Signed and sealed this 1st day of December 1970.

(SEAL)
Attest:

Edward M. Fletcher, Jr.                 WILLIAM E. SCHUYLER, JR.
Attesting Officer                         Commissioner of Patents